(12) United States Patent
Raz et al.

(10) Patent No.: US 8,751,106 B2
(45) Date of Patent: Jun. 10, 2014

(54) DIRECTIONAL HORN AND METHOD OF USE

(75) Inventors: Guy Raz, Rehovot (IL); Eli Tzirkel-Hancock, Ra'Anana (IL)

(73) Assignee: GM Global Technology Operations LLC, Detroit, MI (US)

(*) Notice: Subject to any disclaimer, the term of this patent is extended or adjusted under 35 U.S.C. 154(b) by 92 days.

(21) Appl. No.: 13/432,881

(22) Filed: Mar. 28, 2012

(65) Prior Publication Data

US 2013/0261887 A1    Oct. 3, 2013

(51) Int. Cl.
*G06F 7/00*    (2006.01)
(52) U.S. Cl.
USPC ............................................. 701/36; 381/340
(58) Field of Classification Search
USPC ................. 701/36; 381/340; 181/152
See application file for complete search history.

(56) References Cited

U.S. PATENT DOCUMENTS

| 8,189,825 B2* | 5/2012 | Breed | 381/302 |
| 2008/0129470 A1* | 6/2008 | Croft et al. | 340/384.6 |

* cited by examiner

*Primary Examiner* — Thomas Black
*Assistant Examiner* — Luke Huynh
(74) *Attorney, Agent, or Firm* — Mark S. Cohen; Pearl Cohen Zedek Latzer Baratz LLP

(57) ABSTRACT

A directional horn may include at least one group of a plurality of speakers or audio emitters. The audio emitters may each emit and audio signal at a same frequency. A processor may control a relative phase difference and relative gain difference between each audio signal, based on a determined direction. The directional horn may be positioned on a vehicle. The determined direction may be based on a direction indicated by a driver controlling the vehicle, external environmental factors, vehicle dynamics, or other factors.

17 Claims, 6 Drawing Sheets

DIRECTIONAL HORN AND METHOD OF USE

FIELD OF THE INVENTION

The present invention is related to a directional horn and methods of controlling the directional horn.

BACKGROUND

During operation of a vehicle, horns installed on the vehicle may be used by drivers to alert people and animals of the vehicle's presence and movement. Many vehicle horns may include a flat diaphragm structure that vibrates at predetermined frequency. The vibration may be controlled by an electromagnetic motor or solid state driver circuit. Other horns may be produced by digital audio signals transmitted by a speaker. In a vehicle horn system, multiple horns or audio emitters may be arranged to produce a chord of more than one frequency. A multiple frequency chord may be more perceptible in an environment with high ambient noise.

In many areas, such as highways and urban environments, heavy car usage may result in a high level of ambient noise or noise pollution from an increased amount of honking horns. Noise pollution may negatively affect the health of individuals living near noisy and high-traffic areas. A constant backdrop of noise may elevate stress, causing an increase in blood pressure or a change in heart rhythm, and may increase the pace of hearing loss. Further, pedestrians and other road user may be less alert to horns directed at them. Noise pollution may also negatively impact nearby wildlife.

SUMMARY

A directional horn may include at least one group of a plurality of speakers or audio emitters. The audio emitters may each emit an audio signal at a same frequency. A processor may control a relative phase difference and relative gain difference between each audio signal, based on a desired direction and radiation pattern. The directional horn may be positioned on a vehicle. The desired direction may be based on a direction indicated by a driver controlling the vehicle, external environmental factors, vehicle dynamics, or other factors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
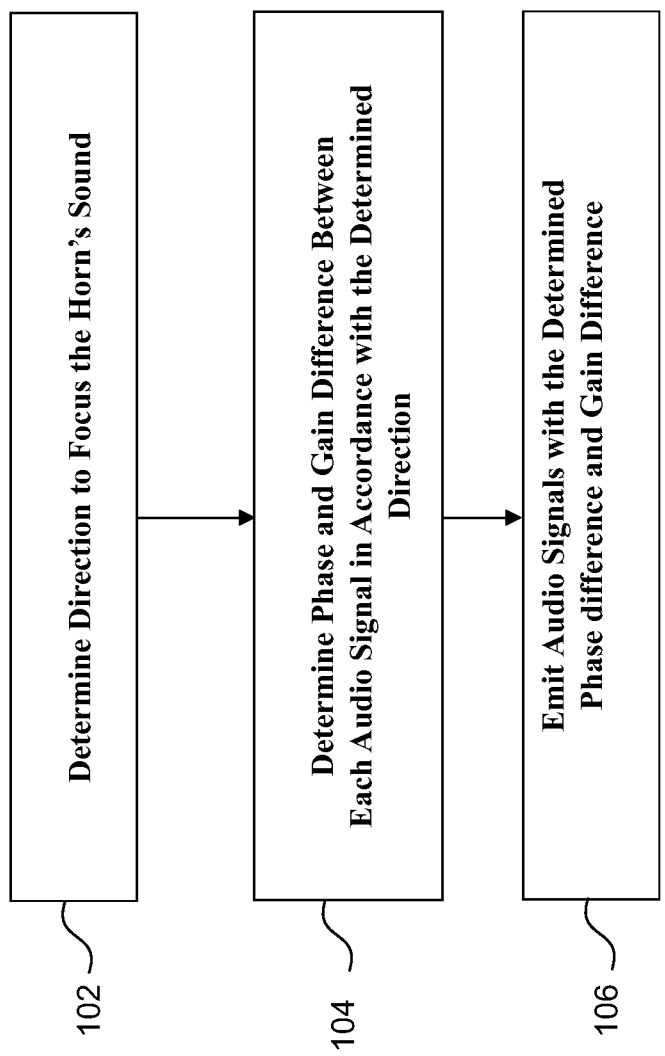
FIG. 1 is a flowchart of a method for using a directional horn, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present invention may be applicable on any vehicle or audio alert system. Vehicles may include cars, trucks, scooters, motorcycles, or bicycles. Directional horns may be installed on vehicles in any convenient location so that it may be controlled by a driver or user and amplified to the vehicle's external environment. For example, in a car, speakers, horns, or acoustic transmitters of a horn system may be mounted behind a radiator grille or on either side of the radiator. The speakers may be electrically coupled with a control circuit or processor that reads input from the steering wheel, for example. The processor may read other kinds of input, such as vehicle dynamics or objects in the external environment.

According to some embodiments of the present invention, a directional horn may include a plurality of audio emitters that transmit simultaneous audio signals utilizing the concept of beamforming to focus the horn's sound in a particular direction. In beamforming, two or more audio signals may be transmitted together with a selected relative phase difference and/or relative gain difference. Relative phase may refer to the phase difference between the phase of a first audio signal, the phase of a second audio signal, the phase of a third audio signal, and so on. Relative power may refer to the ratio between the power of a first audio signal, the power of a second audio signal, and the power of more audio signals if more are utilized. The ratio may be defined on a linear or logarithmic scale. Beamforming may take advantage of constructive and destructive interference between the signals to affect the perceived directionality of the signal. Directionality may indicate that the signals' power is concentrated towards one or more particular direction and that other directions may experience less power. With audio signals, this may mean that individuals at one direction relative to the audio emitters may hear the transmitted sounds at a relatively high volume or stronger amplitude, but individuals at another direction relative to the audio emitters may hear the transmitted sounds at a relatively low volume or weaker amplitude. Since beamforming techniques may allow power to be directed towards a desired location, less overall power is necessary to operate the horn system. For example, approximately 10 db of power may be reduced in undesired directions and noise pollution may be decreased. In any given frequency there may be null directions where complete destructive interference may produce no sound in a direction. When several different frequencies are emitted in combination, the nulls may be averaged.

According to embodiments of the invention, the group of audio emitters may act as a phased array of audio emitters. The phased array may take advantage of its spatial configuration or characteristic to improve performance or efficiency. Depending on the spatial configuration, a processor may be able to manipulate a relative phase difference and relative gain difference between each speaker or audio emitter to concentrate power at a desired location. For example, a configuration of a group of audio emitters may be a simple array of equally spaced audio emitters, emitting signals with the same amplitude. An equation describing the relationship between the direction at which power is a maximum, frequency, and phase difference may be:

$$\theta_m = \arccos\left(\frac{-\phi\left[\frac{v_{sound}}{f}\right]}{2\pi d}\right)$$

Where $\theta_m$ may refer to an angle relative to the phased array at which emitted power is a maximum, $\phi$ may refer to the relative phase difference between each signal, $v_{sound}$ may refer to the velocity of sound, f may refer to the frequency of the audio signal emitted and d may refer to the distance between each element of the phase array. Other equations may be used to describe the relationship between direction, frequency, and phase. The equation described above may illustrate that relative phase difference may vary depending on the desired direction at which to direct the horn's power. A radiation profile of a group of audio emitters may also illustrate the amount of power emitted at different directions relative to the group of audio emitters. The radiation profile may illustrate that power may also be maximized in multiple directions, i.e. the radiation profile may contain more than one major power lobe. For directional efficiency, the distance d between each element of the phase array may be on the order of the wavelength of sound divided by two.

Relative gain difference may also further focus the power or sound of the horn system and reduce power at minor power lobes. For example, in an array of equally spaced audio emitters, the amplitude may be varied between each signal. An array of five audio emitters with triangular amplitude distribution may have an amplitude ratio of 1:2:3:2:1. Another amplitude distribution may be binomial, with a ratio of 1:4:6:4:1. Other ratios may be appropriate depending on the spatial configuration of the speakers or audio emitters.

FIG. 1 is a flowchart of a method for using a directional horn, according to embodiments of the invention. In operation 102, a processor connected to a memory may determine a direction to focus the horn's sound. On a vehicle, for example, the processor may determine a direction based on a direction indicated by a driver of the vehicle. Further, the processor may consider the vehicle's external environment, such as whether the vehicle is on a highway or an urban area. Other factors may be considered in determining an appropriate direction to alert pedestrians or other drivers. In some embodiments, the processor may be connected to an object detection system and determine a direction based on objects in the horn's near vicinity. The determined direction may be a degree angle relative to the vehicle's position. For example, if the processor is determining a direction based on detected objects in the vehicle's near vicinity, the processor may detect a pedestrian to the left of the vehicle and detect another vehicle directly in front of the vehicle that the horn is positioned on. 0° may be a referenced angle to the left of the vehicle. Based on the objects detected, the processor may then determine to focus the horn's sound at 90° and 180°. Other angles describing relative direction may be used, depending on which reference angle is used. For example, the reference angle 0° may be directly in front of the vehicle. The detected objects may then be at 0° and 90°, respectively. Some relative phase differences between audio signals may allow power to be concentrated in more than one direction. For example, a relative phase difference for a group of emitters may have two or more power lobes that point in different directions.

In operation 104, a processor may determine, for at least one group of a plurality of audio signals transmitting at a same frequency, a relative phase and relative gain difference between each audio signal based on the determined direction in operation 102. In some embodiments, a cluster of audio emitters may be included in the horn system. Each audio emitter in the cluster may be capable of transmitting audio signals at a range or continuum of frequencies. The processor may determine relative phase differences and relative gain differences based on the equations described previously. Since the determined direction depends on both the frequency of the transmitted signals and the relative phase difference, the processor may independently determine, for each frequency, a relative phase difference and relative gain difference between audio signals. For example, the multiple audio emitters in the horn system and located on a vehicle may each be able to transmit digital audio signals at frequencies of 380 Hz, 420 Hz, and 440 Hz. Other frequencies may be used. From operation 102, a desired direction to focus the horn system's sound may be at 45° relative to the vehicle's position. The processor may determine that an appropriate phase difference between the audio signals is 90° for the signals at 380 Hz, 35° for the signals at 420 Hz, and 15° for the signals at 440 Hz. Other phase differences may be appropriate depending on, for example, the distance between each audio emitter. For each frequency, the processor may further determine an appropriate relative gain difference between the audio signals. As a whole, the multiple audio emitters whose phase differences and gain differences are independently determined for each frequency may have a radiation profile that is focused in the desired 45° direction, relative to the vehicle. The same principle may be applied to audio emitters that simultaneously emit audio signals at a wider range of frequencies.

In another embodiment, the horn system may include at least one group of audio emitters, each transmitting an audio signal at one frequency, such as 420 Hz or 440 Hz. For example, one group of audio emitters transmitting audio signals may have a frequency of 420 Hz. The processor may determine that a relative phase difference of 35° is appropriate for the determined direction at operation 102. Another group of audio emitters in the horn system may transmit at a frequency of 440 Hz. The processor may determine that a relative phase difference of 45° between the signals at 440 Hz is appropriate for the same determined direction at operation 102.

In operation 106, the audio emitters of the directional horn system may transmit audio signals with the determined relative phase difference and relative gain difference. The audio emitters may together be part of a speaker or speaker system. Relative phase difference may be achieved by introducing a time delay between each relevant signal. The audio emitters may use analog phase elements when generating the digital audio signals to vary the phase difference, utilizing piezoelectric timers or circuits including combinations of resistors, inductors, and capacitors. Relative gain difference may be achieved by adjusting the amplitude of each audio signal. A single filter, such as a finite impulse response (FIR) filter, may be applied to affect both the amplitude and phase of each digital audio signal. Digital phase shifter modules or phasers may also be employed to provide a discrete set of phase shifts or time delays. Other filters may be used singly or in combination. The processor may calculate phase or gain difference values or use a lookup table that depends on the determined direction in operation 102. Delay and amplitude manipulation may be possible for a single frequency. For a multitude of frequencies, delay and amplitude manipulation may be applied independently for each frequency.

Figure 2:
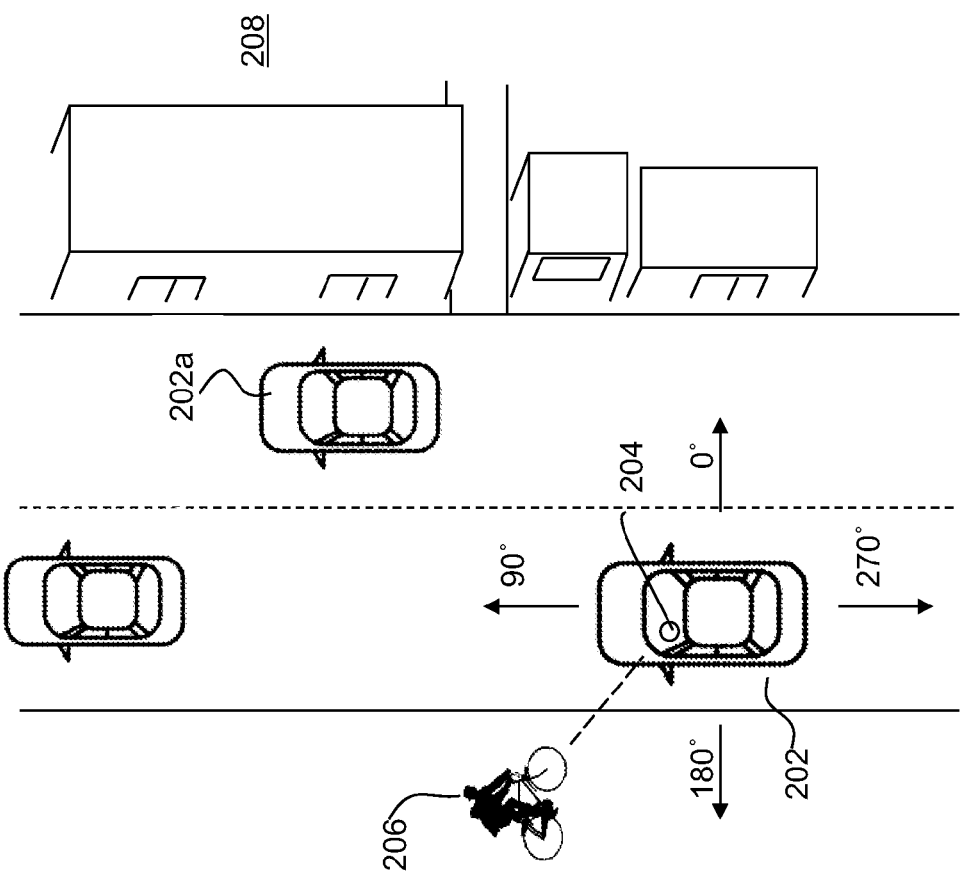
FIG. 2 is a diagram of possible factors that affect a determined direction to focus a horn's sound, according to embodiments of the invention.

FIG. 2 is a diagram of possible factors that affect a determined direction to focus a horn's sound, according to embodiments of the invention. A horn system may be positioned on a vehicle 202. The horn system may include a plurality of audio emitters that transmit audio signals at one or more frequencies, and a processor to determine an appropriate direction to focus the horn's sound and to determine a relative phase difference and relative gain difference between the audio signals that will focus the horn's sound in the determine direction. A driver 204 may be driving or controlling the vehicle.

According to some embodiments, the processor may determine a desired direction to focus based on a direction indicated by the driver 202. The driver 204 may indicate a desired direction by their gaze. The driver 202 may notice a biker 206 approaching the vehicle 202 and wish to activate the horn to warn the biker 206. Based on the illustrated reference angles, the processor may determine that the driver is indicating a direction to focus the sound at about 135°, towards the biker 206. The processor may be attached to a sensor that is able to track a driver's eye gaze, or the direction that the driver's head is facing. The processor may determine or calculate a relative phase difference and relative gain difference for the plurality of audio signals in order to focus their total sound towards the biker 206. When the driver 204 activates the horn, by pushing on the steering wheel for example, the audio emitters may transmit the audio signals with the relative phase difference and relative gain difference determined by the processor. Alternatively or additionally, the driver's 204 gaze may be directed towards the rearview mirror or sideview mirror. The sideview or rearview mirror may be equipped with a sensor that is able to recognize when the driver's eyes are focused into the minor. The sensor may send feedback to the processor. The processor may determine that the desired direction indicated by the driver 204 looking into a rearview minor is, for example, 270°. In some embodiments of the invention, the driver 204 may indicate a direction to focus the horn system's sound by exerting pressure on a particular location on the steering wheel. For the biker at 135°, for example, the driver may exert pressure on the steering wheel at the corresponding angle on the steering wheel's pressure pad.

According to some embodiments of the invention, the processor may consider the external environment of the vehicle 202 and the vehicle's 202 state. For example, the processor may detect a relevant nearby object, such as another vehicle 202a in a next lane. The vehicle 202 may be pre-equipped with an automatic object detection system. When the driver 204 activates the horn system, the audio emitters may transmit audio signals with a relative phase difference and relative gain difference to direct sound towards that vehicle 202a, at approximately 60°. Alternatively or additionally, the processor may determine that the vehicle 202 is in an urban environment 208, driving at a lower speed (compared to rural areas). The processor may determine that the horn's sound should be omni-directional since there may be more pedestrians in a high density area. In another example, the vehicle 202 may be at a highway cruising speed, and the processor may focus the horn at the front of the vehicle 202. The processor may actively monitor the vehicle's 204 external environment and state and continually determine appropriate relative phase differences and relative gain differences as part of the vehicle's safety features.

Figure 3A:
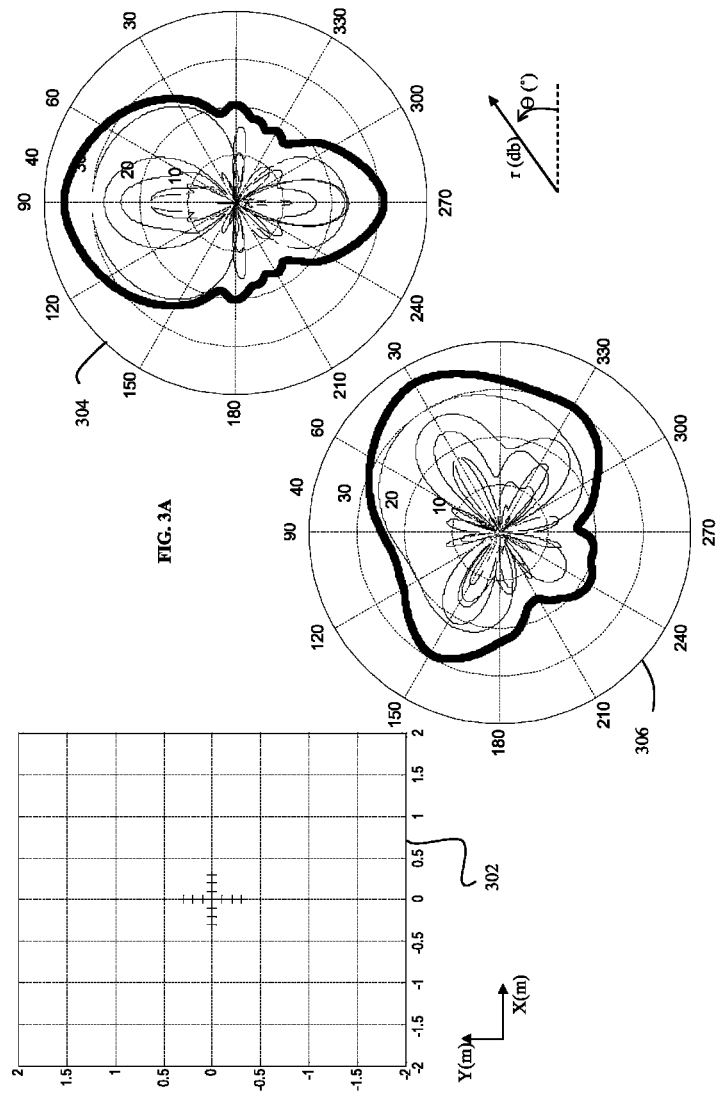
FIGS. 3A and 3B are illustrations of a group of audio emitters and the group's simulated radiation profiles, according to embodiments of the invention.
Figure 3B:
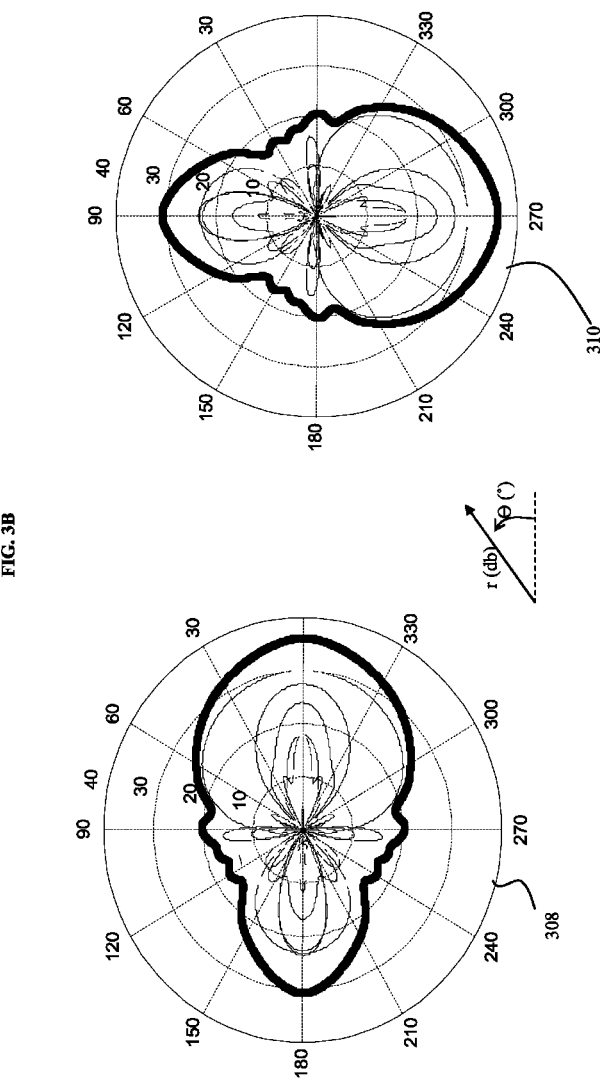

FIGS. 3A and 3B are illustrations of a group of audio emitters and the group's simulated radiation profiles, according to embodiments of the invention. A group of audio emitters may be configured in the shape of a cross 302. As illustrated, the x and y axes are in meters. The audio emitters may transmit audio signals at a multiple frequency. A radiation profile may represent a visualization of the relative power transmitted in all directions by the group of speakers at different frequencies. As indicated in the figure, the radiation profile is represented in polar coordinates, where r is the power level of the audio signal in decibels (db) and $\ominus$ is the direction of the sound in degrees. As illustrated in radiation profile 304, the relative power transmitted by the speaker in the cross configuration 302 may be directed towards 90° and 270°, with most of the power directed towards the 90° direction. Different frequencies 304 may yield different shapes of the directed power, but the direction may still be concentrated at 90° and 270°. In illustration 306, using a different value of a relative phase difference between the speakers, the speaker configuration is able to focus its power in the 30° direction. In other examples, the speaker configuration may be directed towards 0° 308 and 270° 310.

Figure 4A:
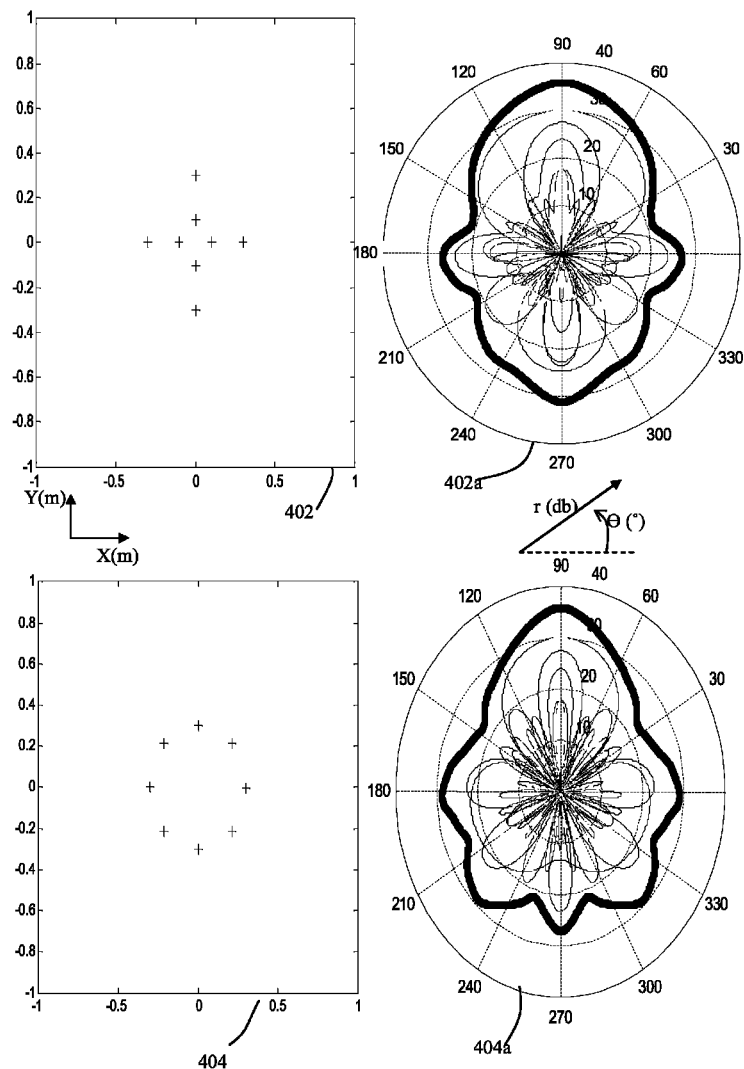
FIGS. 4A and 4B are illustrations of multiple configurations of a group of audio emitters and their simulated radiation profiles, according to embodiments of the invention.
Figure 4B:
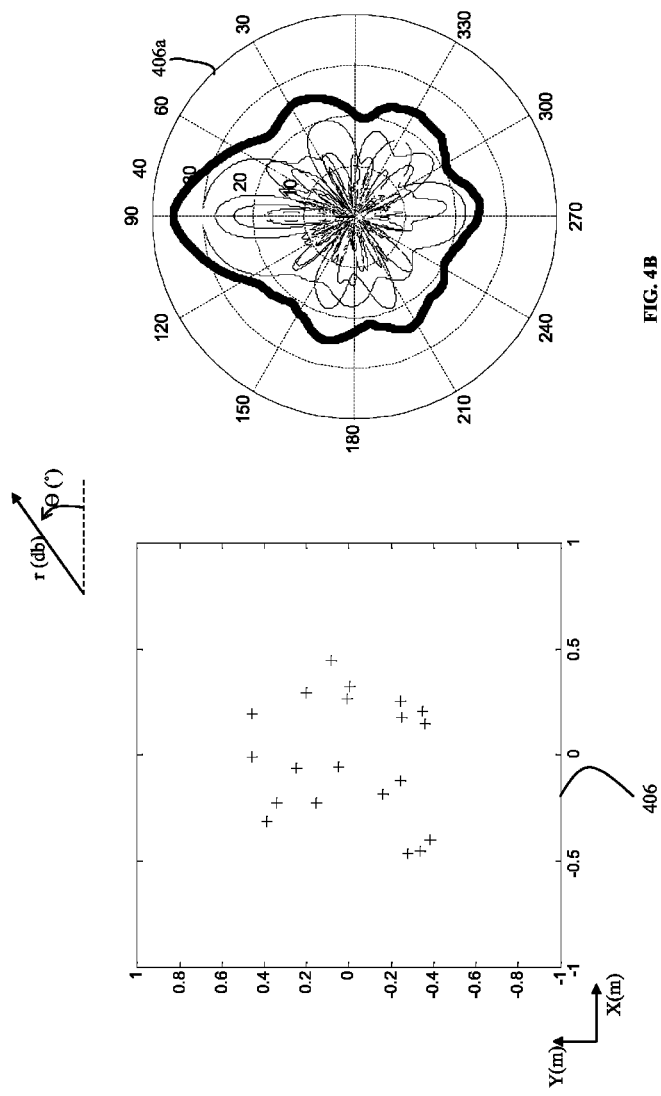

FIGS. 4A and 4B are illustrations of multiple configurations of a group of speakers and their simulated radiation profiles, according to embodiments of the invention. A group of speakers on a directional horn system may have any spatial configuration and a processor may control the relative phase difference and relative gain difference to direct the group's power. Similar to the configuration in FIG. 3, a configuration of speakers may have a cross-like configuration 402 and direct its power in the 90° direction 402a. As indicated in the figure, the radiation profile is represented in polar coordinates, where r is the power level of the audio signal in decibels (db) and $\ominus$ is the direction of the sound in degrees. In another example a configuration of speakers may be circular 404. The radiation profile 404a of the circular configuration 404 may have a different shape than the radiation profile 402a of the cross-like configuration 402, but the power may nonetheless be directed at a 90° angle. A random configuration of speakers 406 may also direct its power towards the 90° direction 406a. It is to be understood in the context of this invention that any configuration of speakers may be used in a directional horn system if its relative phase difference and relative gain difference may be controlled to affect the direction of power concentration. The configuration may need to be predetermined for the processor, so that the processor may be able to calculate phase and gain for a desired direction.

Other operations or orders of operations may be used.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A tunable, vehicular directional horn, comprising:
   a horn mounted on a vehicle, the horn including at least one cluster of audio emitters, each of the audio emitters configured to emit; at least one audio signal; and
   a processor configured to:
   define a direction of focus of a horn sound based on sensor data, the horn sound being a composite of the audio signals,
   define a relative phase difference and a relative gain difference between each the audio signals, in accordance with the direction of focus of the horn sound.

2. The horn of claim 1, wherein each of the audio emitters are configured to emit audio signals at an identical frequency.

3. The horn of claim 1, wherein the sensor data includes data generated from an object detection system.

4. The horn of claim 3, wherein the sensor data includes visual tracking data.

5. The horn of claim 3, wherein the sensor data includes pressure sensor data.

6. The horn of claim 1, wherein the sensor data includes vehicular speed data.

7. The horn of claim 1, wherein the plurality of audio emitters are configured to emit audio signals at multiple frequencies.

8. A method of controlling a vehicular horn sound comprising:
   defining a direction of focus of the vehicular horn sound from sensor data derived from a sensor, the sound formed from a plurality of audio signals; and
   using a processor to define a phase and a gain difference between each of the plurality of audio signals in accordance with the direction of focus of the horn sound; and
   emitting audio signals in accordance with the phase difference and the gain difference.

9. The method of claim 8, wherein the sensor data includes data generated from an object detection system.

10. The method of claim 9, wherein the sensor data includes pressure sensor data.

11. The method of claim 8, wherein the sensor data includes vehicular speed data.

12. The method of claim 8, wherein the sensor data includes visual tracking data.

13. A vehicular horn system, comprising:
    a plurality of audio emitters mounted on a vehicle, each audio emitter configured to emit audio signals;
    a processor configured to define a direction of focus of a composite sound formed from the plurality of the audio signals, the direction of focus derived from sensor data; and
    a processor configured to define a phase difference and a gain difference between each of the audio signals in accordance with the direction of focus of the composite sound.

14. The system of claim 13, wherein the sensor data includes data generated from a visual tracking system.

15. The system of claim 13, wherein the sensor data includes pressure sensor data.

16. The system of claim 13, wherein the sensor data includes vehicular speed data.

17. The system of claim 13, wherein the sensor data includes data generated from an object detection system.

* * * * *